(12) United States Patent
Lewis et al.

(10) Patent No.: US 10,464,031 B2
(45) Date of Patent: Nov. 5, 2019

(54) MICROFLUIDIC ACTIVE MIXING NOZZLE FOR THREE-DIMENSIONAL PRINTING OF VISCOELASTIC INKS

(71) Applicant: President and Fellows of Harvard College, Cambridge, MA (US)

(72) Inventors: Jennifer A. Lewis, Cambridge, MA (US); Thomas J. Ober, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 16/126,723

(22) Filed: Sep. 10, 2018

(65) Prior Publication Data

US 2019/0105622 A1   Apr. 11, 2019

Related U.S. Application Data

(63) Continuation of application No. 15/564,396, filed as application No. PCT/US2016/026412 on Apr. 7, 2016, now Pat. No. 10,071,350.

(Continued)

(51) Int. Cl.
*B41J 2/21* (2006.01)
*B41J 2/175* (2006.01)
(Continued)

(52) U.S. Cl.
CPC ...... *B01F 15/00389* (2013.01); *B01F 3/0861* (2013.01); *B01F 3/0865* (2013.01);
(Continued)

(58) Field of Classification Search
CPC ... B41J 2/175; B41J 2/211; B05B 1/30; B28C 5/026; B28C 5/1229; B29C 64/209; B01F 3/0861; B01F 3/0865; B01F 3/1221; B01F 7/06; B01F 7/248; B01F 13/0064; B01F 13/0059; B01F 15/00253; B01F 15/00389; B33Y 30/00
See application file for complete search history.

(56) References Cited

U.S. PATENT DOCUMENTS 4,606,648 A   8/1986 Coyle et al.
4,906,577 A   3/1990 Armstrong et al.
(Continued)

OTHER PUBLICATIONS

International Search Report and Written Opinion dated Jun. 23, 2016 for PCT Application No. PCT/US2016/026412 (14 pp.).

*Primary Examiner* — Anh T Vo
(74) *Attorney, Agent, or Firm* — Brinks Gilson & Lione

(57) ABSTRACT

A microfluidic printing nozzle for 3D printing may include a mixing chamber, a first inlet for connecting with a first ink source, the first inlet located at a first end of the mixing chamber, and a second inlet for connecting with a second ink source, the second inlet located at the first end of the mixing chamber. An outlet may be located at a second end of the mixing chamber, and a generally cylindrical impeller may be rotatably disposed in the mixing chamber between the first end and the second end. The cylindrical impeller may include an outer surface, and the outer surface of the impeller includes a groove, a protrusion, or both, to facilitate mixing of fluidic inks flowing from the first end to the second end of the mixing chamber.

20 Claims, 10 Drawing Sheets

Related U.S. Application Data

(60) Provisional application No. 62/144,078, filed on Apr. 7, 2015.

(51) Int. Cl.

| | | |
|---|---|---|
| *B01F 15/00* | (2006.01) | |
| *B01F 13/00* | (2006.01) | |
| *B01F 7/06* | (2006.01) | |
| *B01F 3/12* | (2006.01) | |
| *B01F 3/08* | (2006.01) | |
| *B28C 5/02* | (2006.01) | |
| *B05B 1/30* | (2006.01) | |
| *B01F 7/24* | (2006.01) | |
| *B28C 5/12* | (2006.01) | |
| *B33Y 30/00* | (2015.01) | |
| *B29C 64/209* | (2017.01) | |

(52) U.S. Cl.
CPC .............. *B01F 3/1221* (2013.01); *B01F 7/06* (2013.01); *B01F 7/248* (2013.01); *B01F 13/0059* (2013.01); *B01F 13/0064* (2013.01); *B01F 15/00253* (2013.01); *B05B 1/30* (2013.01); *B28C 5/026* (2013.01); *B28C 5/1292* (2013.01); *B29C 64/209* (2017.08); *B33Y 30/00* (2014.12); *B41J 2/175* (2013.01); *B41J 2/211* (2013.01)

(56) References Cited

U.S. PATENT DOCUMENTS

| | | | |
|---|---|---|---|
| 5,470,893 A * | 11/1995 | Sinclair-Day | C08J 3/203 523/200 |
| 5,530,533 A * | 6/1996 | Wallace | G03G 15/104 399/237 |
| 8,608,300 B2 * | 12/2013 | Igawa | B41J 2/175 347/89 |
| 2007/0030322 A1 | 2/2007 | Lee et al. | |
| 2007/0159919 A1 | 7/2007 | Kim et al. | |
| 2008/0100677 A1 | 5/2008 | Boyer et al. | |
| 2008/0166463 A1 | 7/2008 | Green | |
| 2009/0029069 A1 | 1/2009 | Edwards et al. | |
| 2009/0237425 A1 | 9/2009 | Lang | |
| 2010/0047454 A1 | 2/2010 | De Voeght et al. | |
| 2010/0051521 A1 | 3/2010 | Morse | |
| 2012/0200649 A1 | 8/2012 | Igawa et al. | |
| 2014/0354717 A1 | 12/2014 | Bibl | |

* cited by examiner 302, the controller receives a material property associated with each of a plurality of fluid 304, the controller receives a structure property of the printing nozzle 306, based on the material property of the plurality of fluids and the structure property the nozzle, the controller determines a relationship between a volumetric flow rate of the plurality of fluids in the mixing chamber and a rotating speed of the impeller 308, based on the relationship, the controller determines a threshold combination of the volumetric flow rate of the plurality of fluids and the speed of the impeller 310, based on the threshold combination, the controller controls the 3D printer to introduce the plurality of fluids into the mixing chamber at a volumetric flow rate and to rotate the impeller with a rotating speed to mix the plurality of fluids, thereby forming the mixed ink 312, the controller controls the 3D printer to extrude a continuous filament of the mixed ink

Fig. 3

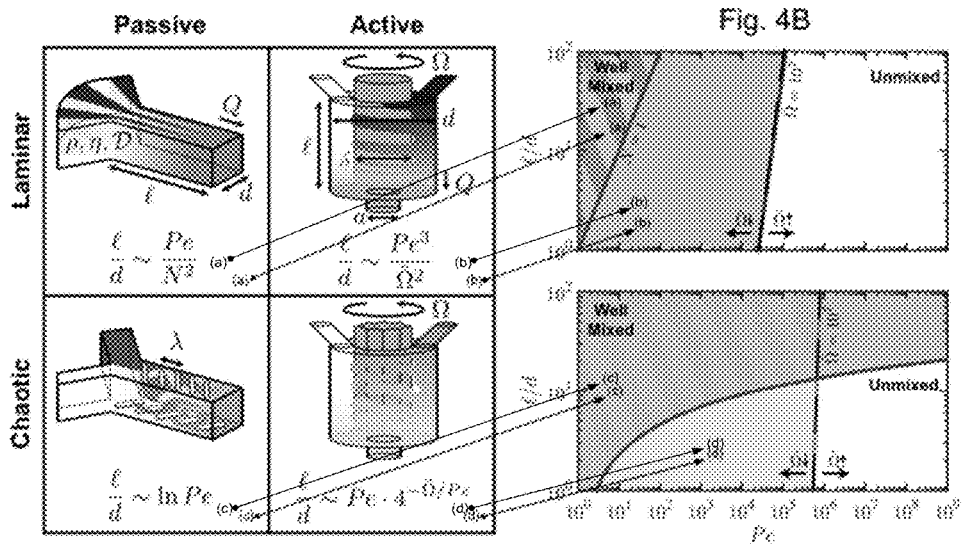
Fig. 4A
Fig. 4B
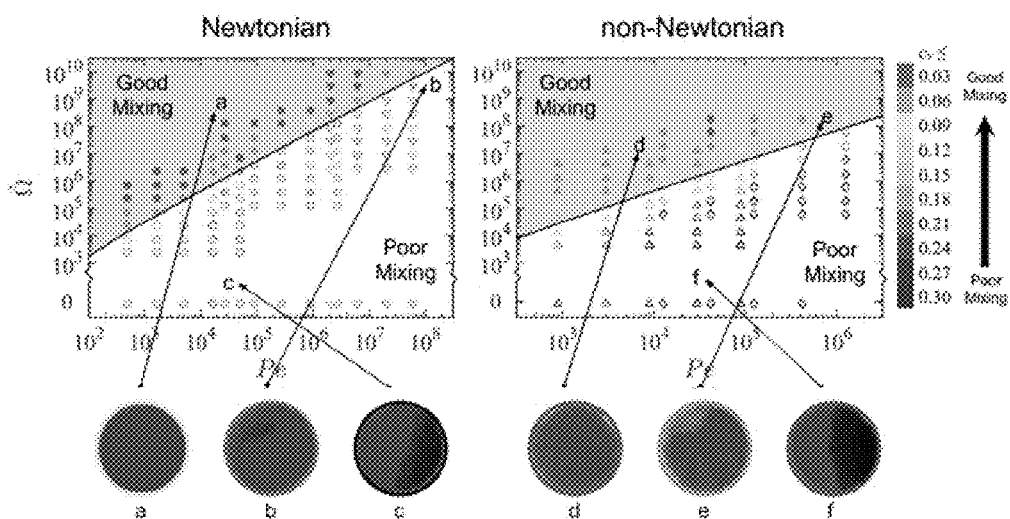
Fig. 5A Newtonian
Fig. 5B non-Newtonian

Smooth Wall  Grooved Wall

MICROFLUIDIC ACTIVE MIXING NOZZLE FOR THREE-DIMENSIONAL PRINTING OF VISCOELASTIC INKS

RELATED APPLICATIONS

This application is a continuation of U.S. patent application Ser. No. 15/564,396, filed Oct. 4, 2017, and issuing as U.S. Pat. No. 10,071,350 on Sep. 11, 2018, which is a filing under 35 U.S.C. § 371 of International Patent Application PCT/US2016/026412, filed Apr. 7, 2016, which claims the benefit of U.S. Provisional Application No. 62/144,078, filed Apr. 7, 2015. All of these applications are hereby incorporated by reference in their entireties.

FEDERALLY SPONSORED RESEARCH OR DEVELOPMENT

This invention was made with government support under contract number DE-AC52-07NA27344 and DE-SC0001293 awarded by the Department of Energy. The government has certain rights in the invention.

TECHNICAL FIELD

The present disclosure generally relates to three-dimensional (3D) printing technology. Specifically, the present disclosure relates to a microfluidic active mixing nozzle for 3D printing of viscoelastic inks.

BACKGROUND 3D printing, also known as additive manufacturing, is a revolutionary, cutting edge technology that frees product design from limitations of traditional manufacturing technologies. 3D printing typically includes using a nozzle to deposit successive layers of a material under computer control. Because a product is manufactured layer by layer, the product can be of almost any shape or geometry. In addition, the product can be fabricated from any of a number of materials that can be prepared in the form of an ink having suitable rheological properties for extrusion through the nozzle and deposition on a substrate. Traditionally, multiple materials have been deposited by 3D printing using more than one nozzle in a serial or parallel deposition process.

SUMMARY

The present disclosure relates to a device for three-dimensional ink deposition from an impeller-driven active mixing microfluidic printing nozzle. The device is configured to receive a material property associated with the plurality of fluids and receive a structure property of the printing nozzle. The device then determines a threshold relation between a rotating speed $\Omega$ of an impeller in the nozzle and a volumetric flow rate $Q$ of fluids that flow through the nozzle based on the material property of the plurality of fluids, the structure property of the printing nozzle. Based on the threshold relation, the device then determines an actual volumetric flow rate of the fluids and actual rotation speed of the impeller.

According to an aspect of the present disclosure, a device may comprise a microfluidic printing nozzle and a controller in electronic communication with the nozzle. The nozzle may comprise a mixing chamber and an impeller rotatably disposed therein. The controller may be configured to: receive a material property associated with each of the plurality of fluids; receive a structure property of the printing nozzle; receive a predetermined volumetric flow rate $Q$ of the plurality of fluids in the mixing chamber; determine a threshold rotating speed $\Omega$ of the impeller based on the material property of the plurality of fluids, the structure property of the printing nozzle, and the predetermined volumetric flow rate $Q$. Further, the controller may be configured to introduce the plurality of fluids into the mixing chamber at the predetermined volumetric flow rate; and rotate the impeller with a rotating speed higher than the threshold rotating speed $\Omega$ to mix the plurality of fluids, thereby forming the mixed ink.

According to another aspect of the present disclosure, a method for three-dimensional ink deposition from an impeller-driven active mixing microfluidic printing nozzle may comprise providing a microfluidic printing nozzle. The nozzle may comprise a mixing chamber; and an impeller rotatably disposed in the mixing chamber to mix a plurality of fluids to form a mixed ink. The method may also comprise receiving by a controller in electrical communication with the printing nozzle: a material property associated with each of the plurality of fluids; a structure property of the printing nozzle; a predetermined volumetric flow rate $Q$ of the plurality of fluids in the mixing chamber. The method may further comprise determining a threshold rotating speed $\Omega$ of the impeller based on the material property of the plurality of fluids, the structure property of the printing nozzle, and the predetermined volumetric flow rate $Q$; introducing the plurality of fluids into the mixing chamber at the predetermined volumetric flow rate; and rotating, under control of the controller, the impeller with a rotating speed higher than the threshold rotating speed $\Omega$ to mix the plurality of fluids, thereby forming the mixed ink.

According to another aspect of the present disclosure, a device may comprise a microfluidic printing nozzle and a controller in electronic communication with the nozzle. The nozzle may comprise a mixing chamber and an impeller rotatably disposed therein. The controller may be configured to: receive a material property associated with each of the plurality of fluids; receive a structure property of the printing nozzle; receive a predetermined rotating speed $\Omega$ of the impeller; determine a threshold volumetric flow rate $Q$ of the plurality of fluids in the mixing chamber based on the material property of the plurality of fluids, the structure property of the printing nozzle, and the predetermined rotating speed of the impeller; introduce the plurality of fluids into the mixing chamber at volumetric flow rate lower than the threshold volumetric flow rate $Q$; and rotate the impeller at the predetermined rotating speed $\Omega$ to mix the plurality of fluids, thereby forming the mixed ink.

According to yet another aspect of the present disclosure, a method for three-dimensional ink deposition from an impeller-driven active mixing microfluidic printing nozzle may comprise providing a microfluidic printing nozzle comprising a mixing chamber and an impeller rotatably disposed in the mixing chamber to mix a plurality of fluids to form a mixed ink. The method may also comprise receiving by a controller in electrical communication with the printing nozzle: a material property associated with the plurality of fluids; a structure property of the printing nozzle; a predetermined rotating speed $\Omega$ of the impeller; determining a threshold volumetric flow rate $Q$ of the plurality of fluids in the mixing chamber based on the material property of the plurality of fluids, the structure property of the printing nozzle, and the predetermined rotating speed of the impeller; introducing the plurality of fluids into the mixing chamber at volumetric flow rate lower than the threshold volumetric flow rate Q; and rotating the impeller at the predetermined rotating speed Ω to mix the plurality of fluids, thereby forming the mixed ink.

BRIEF DESCRIPTION OF THE DRAWINGS

FIG. 3 is a flowchart illustrating a method for actively mixing multiple micro-fluids with the microfluidic active mixing nozzle;

FIG. 4A is a schematic illustration of passive and active mixing nozzle designs;

FIG. 4B is an operating map for mixing behavior of the passive and active mixing nozzle designs;

FIG. 5A illustrates an experimenting result of mixing Newtonian liquids in an active mixing chamber;

FIG. 5B illustrates an experimental result of mixing non-Newtonian liquids in the active mixing chamber;

DETAILED DESCRIPTION

Mixing fluids at low-Reynolds number is fundamental for a broad range of scientific and industrial applications from bioassays, to medical analysis, and additive manufacturing. In the latter case, direct ink write (DIVV) 3D printing is a powerful fabrication technique, which may be implemented in a multi-material mode to fabricate composite materials with added functionality, such as heterogeneous hydrogel scaffolds, cell-laden tissue constructs, optical waveguides, structural epoxies and highly aligned nanowire fibers. A major challenge for multi-material 3D printing is ensuring uniform mixing of highly viscoelastic inks in low volumes and short time scales. Passive mixing in microfluidic devices via chaotic stirring or secondary flows may be limited to low viscosity Newtonian fluids with diffusive colloidal particles, strongly hindering the advancement of research for a broad palette of functional materials and their applications.

The present disclosure provides a microfluidic active mixing nozzle and methods for actively mixing a plurality of fluids in a microchannel. Using these methods, the microfluidic nozzle may be able to uniformly mix diffusive and non-diffusive particles in Newtonian and non-Newtonian inks over a wide range of operating conditions. Various aspects of 3D printing are set forth in detail in the following patent publications, all of which are hereby incorporated by reference in their entirety: PCT/US2014/043860, filed Jun. 24, 2014, PCT/US2014/063810, filed Nov. 4, 2014, PCT/US2014/065899, filed Nov. 17, 2014, and PCT/US2015/015148, filed Feb. 10, 2015. The nozzle and method described herein may in some embodiments have one or more features described in these prior publications.

Figure 1:
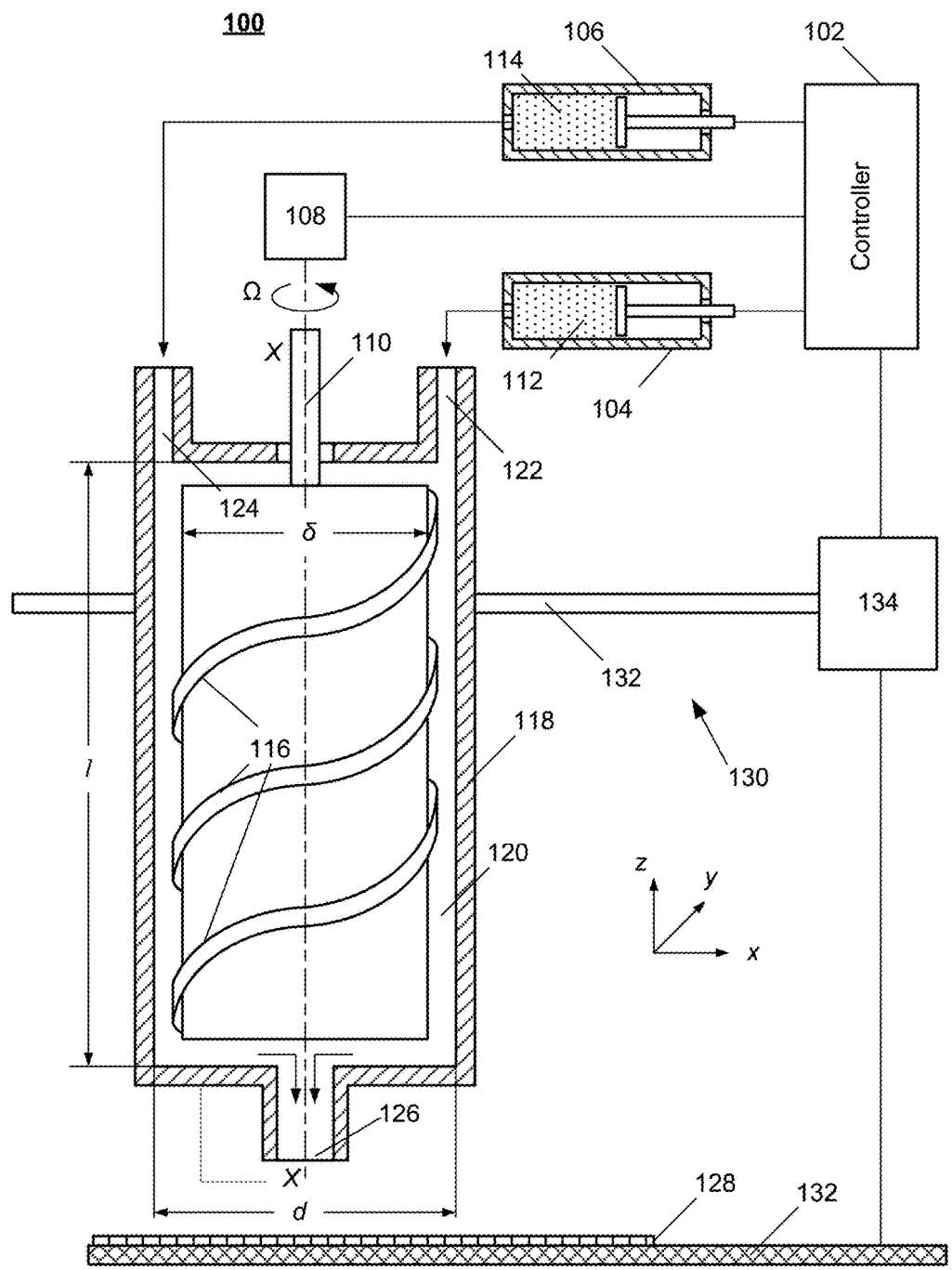
FIG. 1 is a schematic diagram illustrating a 3D printer with a microfluidic active mixing nozzle according to exemplary embodiments of the present application.

FIG. 1 is a schematic diagram illustrating a 3D printer 100 according to exemplary embodiments of the present disclosure. The 3D printer 100 may include a microfluidic active mixing nozzle 118 ("the nozzle"), a plurality of fluid sources 104, 106, a motor 108, an actuator 130, and an electronic controller 102.

The nozzle 118 may include a mixing chamber 120 and an impeller 110. The mixing chamber 120 may be of a cylindrical or prismatic shape with a hydraulic diameter (i.e., effective diameter) d (e.g., d=4 mm, and the mixing chamber has a volume of 150 μL). The inner surface of the mixing chamber may be sufficiently smooth that a fluid flowing through the mixing chamber 120 exhibits laminar flow. Alternatively, the inner surface of the mixing chamber may be sufficiently grooved or coarse the fluid flowing through the mixing chamber 120 exhibits chaotic flow.

The mixing chamber 120 may include a plurality of inlets 122, 124. For example, the mixing chamber 120 may include two inlets 122, 124 at one end. Each inlet 122, 124 may be configured to connect with an ink source containing a fluidic ink. For example, in FIG. 1, the first inlet 122 may be connected to a first ink source 104 containing a first ink 112, and the second inlet 124 may be connected to a second ink source 106 containing a second ink 114. Each ink source 104, 106 may be electronically connected to a controller 102, which may control the ink source to inject and/or introduce the corresponding inks 112, 114 into the mixing chamber 120 at a controlled volumetric flow rate. The ink may be any applicable fluid. For example, the ink may comprise a viscoelastic fluid, such as a surfactant solution, lubricant gel, or elastomeric ink (e.g., SE 1700). Examples of the inks and their corresponding material properties are shown in Table 1.

TABLE 1

| | η [Pa · s] | ρ [kg/m3] | 𝒟 [μm2/s] | τy [Pa] | K [Pa ·sn] | n |
|---|---|---|---|---|---|---|
| Water | 0.001 | 1000 | 500 | | | |
| Water:Glycerol [20:80 wt %] | 0.054 | 1200 | 9.3 | | | |
| Glycerol | 1.2 | 1250 | 0.41 | | | |
| Lubricant Gel | | 1000 | 280 | 20 | 20 | 0.44 |
| Pluronic | | 1050 | 20 | 500 | 2 | 0.85 |
| SE 1700 | | | | 1400 | 180 | 0.65 |

The mixing chamber 120 may also include an outlet 126. The outlet may be located at the other end of the mixing chamber 120 opposite to the inlets 122, 124 may have a diameter a (e.g., α=500 μm). When the ink source 104, 106 introduces a plurality of inks 112, 114 into the mixing chamber 120, the inks may flow through the mixing chamber 120, undergo active mixing by the impeller 110, and exit the mixing chamber 120 through the outlet 126 as a mixed ink.

The impeller 110 may be rotatably and coaxially disposed in the mixing chamber 120. It may have a cylindrical or prismatic shape with a hydraulic diameter S (e.g., δ=2.7 mm). The hydraulic diameter δ may be slightly smaller than the hydraulic diameter d of the mixing chamber 120, so that there is a small gap between the mixing chamber 120 and the impeller 110. Further, the mixing chamber 120 and the impeller 110 may form an effective mixing length l (e.g., l=30 mm) therebetween along the axis X-X. In the event that the length of the impeller 110 substantially equals the length of the mixing chamber 120, the effective length l may be equal to a length of the mixing chamber 120, as shown in FIG. 1.

The impeller 110 may be connected to a motor 108, which may be electronically in communication with and under control of the controller 102. Consequently, the controller 102 may be able to control the motor 108 to drive the impeller 110 to rotate at a desired speed Ω. Accordingly, when the plurality of fluidic inks 112, 114 flow through the gap between the inner surface of the mixing chamber 120 and outer surface of the impeller 110, rotating the impeller 110 may actively mix the plurality of fluidic inks 112, 114.

The surface of the impeller 110 may be smooth, grooved and/or contain protrusions. For example, in FIG. 1, the surface of the impeller 110 includes a spiral protrusion 116 to facilitate mixing of the plurality of fluidic inks 112, 114 as they flow through the mixing chamber 120. An advantage of active mixing is decoupling the mixing process from the flow rate and mixing geometry; thus, mixing of ideally any type of fluidic inks 112, 114 may be achieved with low residence time (i.e., a time needed to flow through the mixing chamber 120), pressure losses and mixing volumes.

In addition to the nozzle 118, the plurality of fluid sources 104, 106, the motor 108, and the electronic controller 102, the 3D printer 100 may also include an actuator 130 mechanically connected to the nozzle 118. The actuator 130 may be any type of mechanical structure that can provide linear and/or rotational motion to the nozzle 118. For example, the actuator 130 may be a carriage rail structure typically used in inkjet printers. The nozzle may be mechanically mounted on a carriage rail 132. A carriage motor 134 may be configured to drive a belt or a thread to move the nozzle 118 along the x, y, and/or z direction. By moving the nozzle 118 with a predetermined and controlled path, the 3D printer may be able to deposit the mixed fluidic ink that flows out of the outlet 126 at a predetermined pattern on a substrate 128, which is placed on a platform 132 of the 3D printer 100.

Alternatively, the platform 132 may be mechanically connected to the actuator 130. The 3D printer 100 may be able to deposit the mixed fluidic ink with the predetermined pattern by moving the platform 132 along the x, y, and/or z direction.

Figure 2:
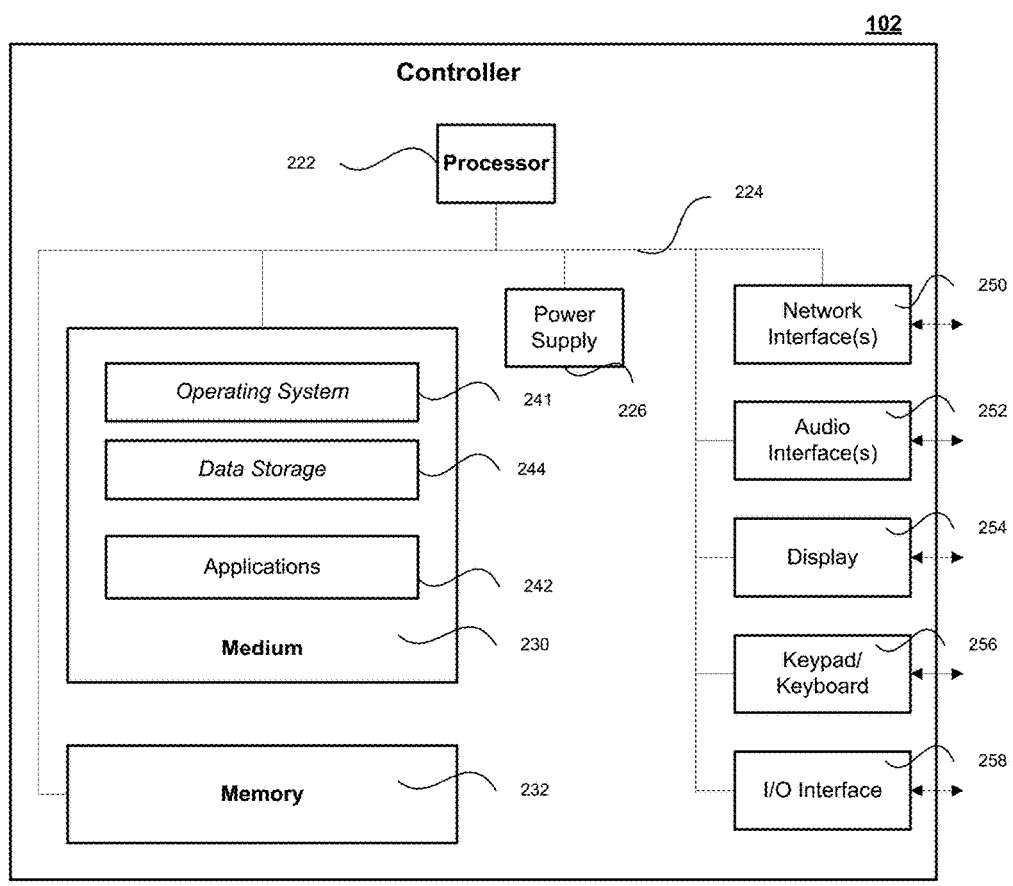
FIG. 2 is a schematic diagram illustrating an exemplary embodiment of a server.

FIG. 2 is a schematic diagram illustrating an exemplary embodiment of an electronic controller 102. The electronic controller may be a specially designed electronic device for controlling the 3D printer 100 or may be a computer implementing special applications for controlling the 3D printer 100. The controller may be configured for wired or wireless communication with the 3D printer 100. The controller 102 may vary widely in configuration or capabilities, but it may include one or more central processing units 222 and memory 232, at least one medium 230 (such as one or more transitory and/or non-transitory mass storage devices) for storing application programs 242 or data 244 that may control components of the 3D printer 100. The processing units 222 may execute the application programs 242 or data 244 to perform the controlling methods disclosed in the present disclosure.

The controller 102 may further include one or more power supplies 226, one or more wired or wireless network interfaces 250, one or more input/output interfaces 258, and/or one or more operating systems 241, such as Windows Server™, Mac OS X™, Unix™, Linux™, FreeBSD™, or the like. Thus a controller 102 may include, as examples, industrial programmable motor controllers with or without a graphical user interface, dedicated rack-mounted servers, desktop computers, laptop computers, set top boxes, mobile computational devices such as smart phones, integrated devices combining various features, such as two or more features of the foregoing devices, or the like.

FIG. 3 is a flowchart illustrating a method for actively mixing multiple micro-fluids with the microfluidic active mixing nozzle 118. The method may be implemented using the 3D printer 100. For example, the method may be implemented as a set of instructions stored in the storage medium 230 and may be executed by the processor 222 of the controller 102. The method may include the following operations:

In 302, the controller receives a material property associated with each of a plurality of fluids and a predetermined degree of mixture of the plurality of fluids. For example, the plurality of fluids may be first ink 112 and a second ink 114.

The degree of mixture may reflect a degree of completeness to which the plurality of fluids may be mixed in the mixing chamber 120. It may be expressed by a degree of mixture coefficient ε, which is defined as $$\varepsilon \equiv \frac{s_f - s_u}{s_m - s_u},$$

wherein $s_f$ is a measurement of Shannon entropy index of particle distributions across the width of the mixed ink filament extruded from the nozzle; $s_m$ is the entropy of a hypothetically perfectly mixed filament; and $s_u$ is the entropy of a completely unmixed filament. Alternatively, the value of degree of mixture coefficient ε may be obtained empirically and may be stored in the storage medium of the controller 102 as a database. For example, for a complete mixture, ε=1; and for completely unmixed fluids ε=0.

The plurality of fluids may be compatible with each other so that mixing thereof is possible. In an exemplary embodiment, the first ink 112 may be a carrier fluid (e.g., water) and the second ink 114 may be a concentrated dye solution (e.g., dye particle in water). In another exemplary embodiment, the first and second inks may be a two-part epoxy, e.g., the first ink 112 may be a resin and the second ink 114 may be a curing agent.

The material property may include whether a fluid of the plurality of fluids contains Brownian or non-Brownian particles. It may also include a diffusion transport coefficient 𝒟 of the particles plurality of fluids. The diffusion transport coefficient 𝒟 may be molecular diffusion coefficient of a particle (of a given type and size) of a fluid in a carrier fluid. For example, the diffusion transport rate 𝒟 may be the molecular diffusion coefficient of a dye particle in the second ink 114 in the water of the first ink 112; or the diffusion transport coefficient 𝒟 may be the molecular diffusion coefficient of a particle of the curing agent in the resin. The value of 𝒟 for a given particle may be different in different carrier fluids. When the viscosity of each of the plurality of fluids is substantially the same, the diffusion transport coefficient $\mathcal{D}$ among the plurality of fluids may be substantially the same. For example, the diffusion transport rate of a water-based dye solution to water may be substantially the same as the diffusion transport rate of the water to the water-based dye solution. Alternatively, when the plurality of fluids have different viscosities, the diffusion transport rate (i.e., first diffusion transport rate) of a first fluid in a second fluid may be different from the diffusion transport rate (i.e., second diffusion transport rate) of the second fluid in the first fluid. For example, the first diffusion transport rate may be 3 times or even more than the second diffusion transport rate. Mixing fluids with similar diffusion transport rates is generally easier than mixing fluids with different diffusion transport rates.

The material property of the plurality of fluids may be manually input by a user of the 3D printer 100. Alternatively, the material property of the plurality of fluids may be automatically and/or dynamically obtained. For example, the controller 102 may include a data base of different fluids in its storage medium. Once the identities of the first ink 112 and the second ink 114 are input by the user and/or detected by a sensor in the ink sources 104, 106, the controller 102 may search the database and automatically obtain the material property of the first and second inks 112, 114.

In 304, the controller receives a structure property of the printing nozzle.

The structure property of the nozzle may include the hydraulic diameter d of the mixing chamber 120, the hydraulic diameter δ of the impeller, and the effective mixing length l of the mixing nozzle. The diameter δ of the impeller may be slightly smaller than the diameter d of the mixing chamber 120, as described above. Further, when the length of the mixing chamber 120 is substantially the same length of the impeller, the length of the chamber is substantially the same as the effective length l.

The structure property of the nozzle may also include surface characteristics of the mixing chamber 120 and the impeller 110. For example, the mixing chamber 120 and/or the impeller 110 may have smooth surfaces to enable laminar flow of the plurality of fluids or may be grooved or with protrusions 116 to enable chaotic flow to the plurality of fluids.

In 306, based on the material property of the plurality of fluids and the structure property of the nozzle, the controller 102 determines a relationship between a volumetric flow rate Q of the plurality of fluids in the mixing chamber 120 and a rotating speed Ω of the impeller.

In order to mix Brownian fluids (liquids laden with Brownian particles) when the mixing chamber 120 is smooth enough to enable laminar flow, the minimum residence timescale $t_{res}$ of a fluid element in the mixing chamber 120 must exceed a time $t_{mix}$ required for the particles to diffuse over a characteristic distance set by the flow dynamics within the mixing chamber 120. Without the impeller 110, when the mixing chamber 120 is smooth enough to enable laminar flow, two streams converge into a single rectilinear channel of length l and hydraulic diameter d. An efficient mixing of the two streams may require that $$l/d \gtrsim Pe/N^2 \qquad (1)$$

where Pe is the Péclet number defined as $Pe \equiv Q/d\mathcal{D}$, Q is volumetric flow rate of the whole mixed streams through the mixing chamber 120, and N is a number of layers of the plurality of fluids formed in the mixing chamber 120.

With an impeller-driven active mixing, when the impeller 110 rotates at rotation speed Ω, the residence time is given by $t_{res} \approx l(d^2-\delta^2)/Q$. The rapid motion of the impeller induces a shear rate $\dot{\gamma} = \delta\Omega/(d-\delta)$ that is independent from the volumetric flow rate Q. Furthermore, the effective diffusion distance is some fraction of the mixing chamber diameter $d_{eff} \sim d/m$, where $m \sim \Omega t_{res}$ is proportional to the number of revolutions completed by the impeller while a fluid element resides in the mixing chamber 120. By equating the two timescales, the relation between the volumetric flow rate Q and the rotation speed Ω of the impeller may bear a relation as, in a dimensionless form, $$\frac{l}{d} > c_1 \varepsilon \frac{Pe^3}{\alpha^2 \tilde{\Omega}^2} \qquad (2)$$

where the dimensionless rotation rate is $\tilde{\Omega} \equiv l d\Omega/\mathcal{D}$, $\alpha \equiv 1 - \delta^2/d^2$, $c_1$ is a constant value, and ε is the degree of mixture coefficient.

For Brownian fluids and when surfaces of the mixing chamber 120 and the impeller 110 are configured to enable a chaotic flow, such as when the inner wall of the mixing chamber 120 is grooved and/or when the impeller is grooved and/or includes protrusions 116, without rotation of the impeller 110, the effective mixing distance is $d_{eff} \sim d/2^n$, where n is proportional to the number of grooves in the mixing chamber. The mixing timescale is therefore $t_{mix} \sim d_{eff}^2/\mathcal{D}$. Accordingly, efficient mixing of the plurality of fluids ma require that $$l/d \gtrsim \ln(Pe) \qquad (3)$$

With an impeller-driven active mixing, when the impeller 110 rotates at rotation speed Ω, if the impeller is grooved and induces chaotic advection within the mixing chamber, then the effective diffusion length is $d_{eff} \sim d/2^m$, in which case the volumetric flow rate Q and the impeller rotation speed Ω may bear a relation of, $$\frac{l}{d} > \frac{c_2 \varepsilon Pe}{\alpha} 4^{-\tilde{\Omega}\alpha/Pe} \qquad (4)$$

wherein $c_2$ is a constant.

The plurality of fluids may comprise non-Brownian fluids, such as highly elastic inks or pastes with large filler material, e.g., pigments or fibers, for which thermal motion is negligible. Because molecular diffusion cannot mix these particles, uniform homogenization occurs only if the final length scale of interdigitation between the incoming streams reaches the order of the particle size $d_p \sim d/2^m$. Following similar reasoning used to derive Eq. (2) and (4), the ratio of the impeller rotation speed Ω and the volumetric flow rate Q of the plurality of fluids may be expressed as $$\frac{ld^2\Omega}{Q} > c_3 \varepsilon \ln\frac{d}{d_p} \qquad (5)$$

wherein $c_3$ is a constant.

In 308, based on the relationship, the controller 102 determines a threshold combination of the volumetric flow rate Q of the plurality of fluids and the rotation speed Ω of the impeller.

In 310, the controller 102 controls the 3D printer to introduce the plurality of fluids into the mixing chamber 120 at a volumetric flow rate Q' and to rotate the impeller with a rotation speed Ω' to mix the plurality of fluids, thereby forming the mixed ink. The actual volumetric flow rate Q' and the actual impeller rotation speed Ω' are so selected so that a ratio thereof is lower than or equal to a ratio of the threshold volumetric flow rate Q over the threshold rotating speed Ω, i.e., $$\frac{Q'}{\Omega'} \le \frac{Q}{\Omega}. \tag{6}$$

According to an exemplary embodiment of the present disclosure, the controller 102 may receive a predetermined volumetric flow rate Q of the plurality of fluids as a whole in the mixing chamber 120. And then the controller 102 may determine a threshold rotating speed Ω of the impeller based on the material property of the plurality of fluids, the structure property of the printing nozzle, and the predetermined volumetric flow rate Q.

To this end, the controller may determine the nature of the plurality of fluids and whether the mixing chamber 120 and the impeller 110 are configured to enable laminar flow or chaotic flow of the plurality of fluids. When the plurality of fluids are Brownian fluids and when both the mixing chamber 120 and the impeller 110 are smooth enough for laminar flow, the controller 102 may determine a threshold rotation speed of the impeller 110 based on Eq. (2), which takes a form of:

$$\Omega = \frac{Q}{\alpha l d^2}\sqrt{\frac{c_1 \varepsilon Q}{\alpha l D}}. \tag{7}$$

When the plurality of fluids are Brownian fluids and when one or both of the mixing chamber 120 and the impeller 110 are grooved or include protrusions, so that the plurality of fluids exhibit chaotic flow when flowing through the gap between the inner surface of the mixing chamber 120 and the impeller 110, the controller 102 may determine the threshold rotation speed of the impeller 110 based on Eq. (4), which takes a form of:

$$\Omega = \frac{Q}{\alpha l d^2}\log_4 \frac{c_2 \varepsilon Q}{\alpha l D}. \tag{8}$$

When at least one of the plurality of fluids is a non-Brownian fluid, the controller 102 may determine the threshold rotation speed of the impeller 110 based on Eq. (5), which takes a form of $$\Omega = \frac{c_3 \varepsilon Q}{\alpha l d^2}\ln\frac{d}{d_p}, \tag{9}$$

wherein $d_p$ is the particle size of the non-Brownian fluid.

After the threshold impeller rotation speed is determined, the controller 102 may control the ink sources 104, 106 to introduce the plurality of fluids into the mixing chamber 120 at the predetermined volumetric flow rate Q and control the motor 108 to rotate the impeller at a rotating speed Ω' higher than the threshold rotation speed Ω to mix the plurality of fluids.

According to another exemplary embodiment of the present disclosure, the controller 102 may first receive a predetermined rotating speed Ω of the impeller 110. And then the controller 102 may determine a threshold volumetric flow rate Q of the plurality of fluids as a whole in the mixing chamber 120 based on the material property of the plurality of fluids, the structure property of the printing nozzle, and the predetermined rotating speed Ω.

To this end, the controller may determine the nature of the plurality of fluids and whether the mixing chamber 120 and the impeller 110 are configured to enable laminar flow or chaotic flow of the plurality of fluids. When the plurality of fluids are Brownian fluids and when both the mixing chamber 120 and the impeller 110 are smooth enough for a laminar flow, the controller 102 may determine the threshold volumetric flow rate Q of the plurality of fluids based on Eq. (2), which takes a form of $$Q = \alpha l d \cdot \sqrt[3]{\frac{d D \Omega^2}{c_1 \varepsilon}}. \tag{10}$$

When the plurality of fluids are Brownian fluids and when one or both of the mixing chamber 120 and the impeller 110 are grooved or include protrusions, so that the plurality of fluids may exhibit chaotic flow when flowing through the gap between the mixing chamber 120 and the impeller 110, the controller 102 may determine the threshold volumetric flow rate Q of the plurality of fluids based on Eq. (4), which takes a form of $$Q\log_4 \frac{c_2 \varepsilon Q}{\alpha l D} = \alpha l d^2 \Omega. \tag{11}$$

When at least one of the plurality of fluids is non-Brownian fluid, the controller 102 may determine the threshold volumetric flow rate Q of the plurality of fluids based on Eq. (5), which takes a form of $$Q = \frac{\alpha l d^2}{c_3 \varepsilon}\ln\frac{d_p}{d} \cdot \Omega. \tag{12}$$

After the threshold volumetric flow rate Q of the plurality of fluids is determined, the controller 102 may control the motor 108 to rotate the impeller at the predetermined rotating speed Ω and control the ink sources 104, 106 to introduce the plurality of fluids into the mixing chamber 120 at a total volumetric flow rate Q' that is lower than the threshold volumetric flow rate Q to mix the plurality of fluids.

In the event that a varying degree of mixture and/or varying mixing speed is required, the controller 102 may determine a corresponding variation of the threshold volumetric flow rate and/or impeller rotation speed. For example, when the first ink 112 is a curing agent and the second ink 114 is a resin, the controller 112 may dynamically receive a request for varying epoxy feeding speed (volumetric flow rate) and varying degree of mixture from a user, and may dynamically determine the corresponding impeller rotation speed. Consequently, the nozzle may be able to dynamically provide the mixed epoxy with the required degree of mixture and feeding speed.

In 312, the controller may control the nozzle to extrude a continuous filament of the mixed ink on a substrate. By moving the nozzle 118 or the platform 132 or both along a predetermined way, the 3D printer 100 may be able to layer by layer print a 3D structure as designed. For example, the 3D printer 100 may use an elastomeric ink, such as polydimethylsiloxane (e.g. SE 1700), to print materials with local variations in mechanical properties (such as elastic modulus) for applications including soft robotics and flexible electronics FIG. 4A is a schematic comparison of mixing nozzle designs for passive and active mixing chambers using laminar and chaotic flow. FIG. 4B is an operating map for mixing nozzles. As can be seen from the figures, the boundaries between regimes of good (shaded) and poor (unshaded) mixing are given by the curves, wherein the solid lines correspond to passive mixing (without impeller) of the same row in FIG. 4A and the dashed lines corresponds to active mixing (with impeller) of the same row in FIG. 4A. Correspondingly, the mixing nozzle design (a) shown in FIG. 4A corresponds with zone (a) of the operating map in FIG. 4B; the mixing nozzle design (b) shown in FIG. 4A corresponds with zone (b) of the operating map in FIG. 4B; the mixing nozzle design (c) shown in FIG. 4A corresponds with zone (c) of the operating map in FIG. 4B; and the mixing nozzle design (d) shown in FIG. 4A corresponds with zone (d) of the operating map in FIG. 4B. Further, in FIG. B, the position of the boundary for the active mixing chamber corresponds to $\tilde{\Omega}=10^7$ and can be moved by changing impeller speed. The curves for the active mixing chamber have been calculated with $\alpha=0.54$ and $\beta=0.38$.

According to exemplary embodiments of the present disclosure, three Newtonian fluids were tested as reference materials along with several viscoelastic inks commonly used for DIW 3D printing (Table 1). In order to evaluate the efficiency of mixing the Brownian particles in each nozzle, a dyed and undyed stream of the same fluid were mixed at equal flow rates (i.e. $Q_{dyed}=Q_{undyed}=\frac{1}{2}Q$), and the concentration distribution in the cross-section of the nozzle outlet was imaged. The extent of mixing was quantified by the coefficient of variation $c_v$ of the image intensity ($c_v \to 0$ with increasing homogenization), which has been previously used in mixing studies in microfluidic devices.

Whereas mixing in the passive mixing chamber was governed only by Pe (FIG. 8), the mixing process in the impeller-driven active mixing chamber (IDAM) can be controlled by varying the impeller speed $\Omega$ according to the rewritten form of Eq. (4)

$$\tilde{\Omega} \gtrsim \frac{1}{\alpha} Pe\left(\ln Pe - \ln\left(\frac{l}{d}\alpha\right)\right). \quad (13)$$

Figures 8A, 8B:
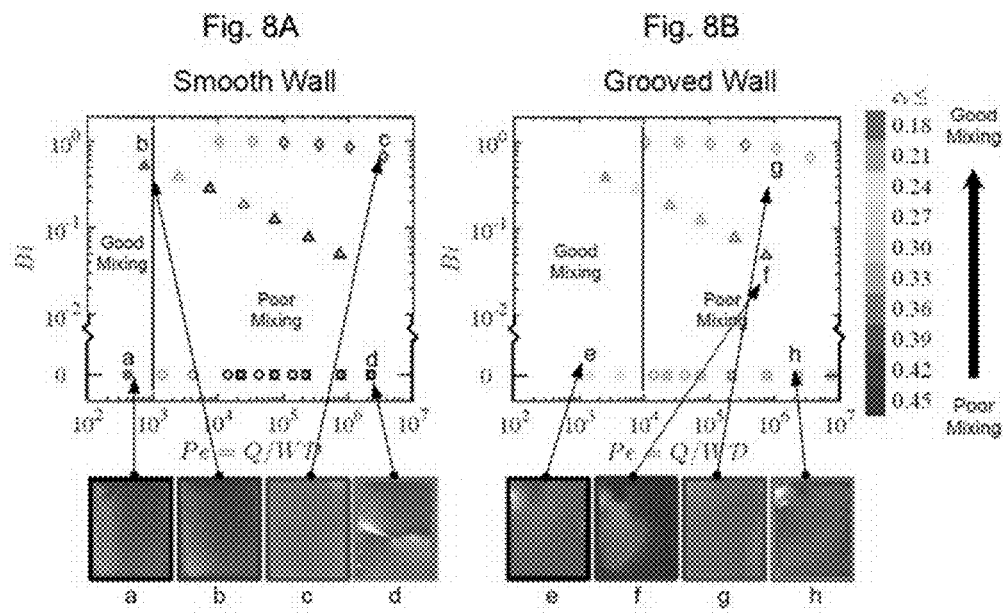
FIG. 8A illustrates mixing result in a passive mixing chamber with smooth wall.
FIG. 8B illustrates mixing result in a passive mixing chamber with grooved wall.

FIG. 8 illustrates mixing results in the passive mixing chamber. The figure shows a plot of coefficient of variation $c_v$ in the Bi-Pe phase space for the smooth wall (FIG. 8A) and grooved wall (FIG. 8B) passive mixing chambers as determined from the color saturation images of the nozzle cross-sections for water (circle), water:glycerol [20:80 wt %] (square), lubricant gel (upright triangle) and pluronic (diamond). The solid and hollow symbols indicate regimes of good and poor mixing respectively, corresponding to images in which a sharp interface between dyed and undyed streams could be visually observed. Representative grayscale images of the color saturation are shown below each plot with bright and dark regions indicating dyed and undyed streams. The test fluids are, respectively, water (a, e), water:glycerol [20:80 wt %] (d, h), lubricant gel (b, f), and pluronic (c, g).

Hence, for a constant value of l/d, the mixing efficiency in the IDAM was controlled by two independent parameters $\tilde{\Omega}$ and Pe.

FIG. 5 illustrates an experimental result of mixing in the active mixing chamber. The figure illustrates a plot of coefficient of variation $c_v$ in the $\tilde{\Omega}$-Pe phase space for Newtonian liquids (FIG. 5A) and yield stress fluids (FIG. 5B, non-Newtonian fluids) as determined from the channel intensity of images of the nozzle cross-sections for water (circle), water:glycerol [20:80 wt %] (square), glycerol (inverted triangle), lubricant gel (upright triangle) and pluronic (diamond). The solid black curve follows the relation $\tilde{\Omega}=3$ Pe $(\ln Pe - \ln(\alpha^l/d))/\alpha$, which separates the regions of good and poor mixing indicated by solid and hollow symbols respectively, corresponding to images in which a sharp interface between dyed and undyed streams could be visually observed. Representative grayscale images of the color saturation are shown below each plot with bright and dark regions indicating dyed and undyed streams. The color of the border indicates the test fluid: gold (water:glycerol [20:80 wt %]), purple (glycerol), blue (lubricant gel) and green (pluronic).

The results in FIG. 5 show that fluid inertial effects may have affected the mixing in water since Re≲850, but were negligible for all other test fluids since Re≲10. For all calibration experiments, the impeller shaft with grooves but no notches (FIG. 9) was used, because the notched impeller induced sufficient cross-streamwise fluid motion, even for no rotation (i.e. $\Omega=0$), so as to make identification of the poor mixing regime inordinately challenging.

Figure 9A:
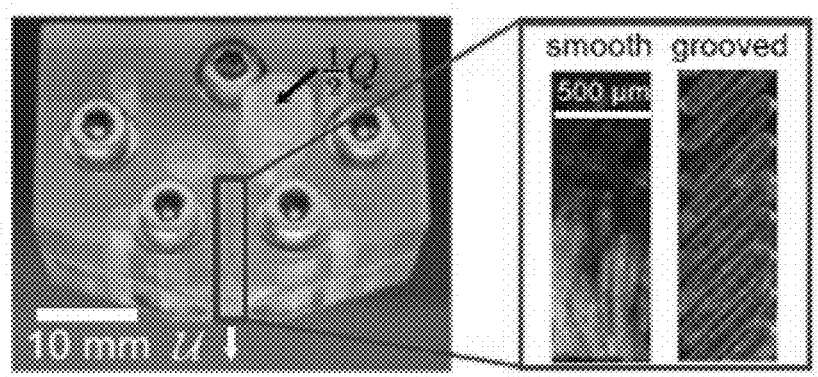
FIG. 9A is an optical image of a passive mixing chamber.
Figure 9B:
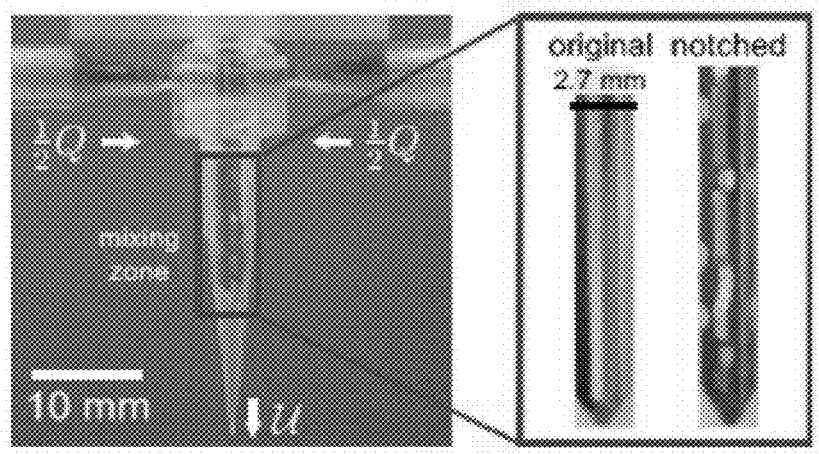
FIG. 9B is an optical image of an active mixing chamber.

FIG. 9 is optical images of the mixing chambers. The passive mixing chamber (FIG. 9A) consists of a Y-type junction and a long duct of hydraulic diameter d=500 μm and length l=15 mm. The channel surfaces of the passive mixing chambers are shown in the magnified image. The active mixing chamber (FIG. 9B) consists of two inlet channels connecting to the central mixing volume of length l=30 mm, diameter d=4 mm and outlet diameter $\alpha$=500 μm with the impeller of diameter $\delta$=2.7 mm. The two types of impellers are shown in the magnified image. An alternative design with metal fixtures was implemented for mixing with highly viscous epoxy systems.

The $c_v$ values for the Newtonian fluids of the $\tilde{\Omega}$-Pe phase space are plotted in FIG. 5A along with representative images of the nozzle cross-section for good (image a) and poor (image c) mixing. The boundary between these two regimes is delineated by the black curve given by $\tilde{\Omega}=3$ Pe($\ln Pe-\ln(\alpha^l/d))/\alpha$, which lies approximately along the $c_v$-isocontour at which a distinct interface between dyed and undyed streams could not be easily identified (image b). The precise value of the proportionality coefficient (here 3) was empirically determined for the particular IDAM used in this study and may not always be universal for similar active mixing systems. Nevertheless, its value was of order unity, validating the applicability of the derivation of Eq. (4). Clearly, the IDAM could reliably homogenize multiple streams of Newtonian liquids over many orders of magnitude of Pe, corresponding to typical print speeds for DIW 3D printing (i.e. 0.1≤U≤100 mm/s).

Two aqueous non-Newtonian yield stress materials (FIG. 5B), which were shown previously to mitigate the effectiveness of the passive mixing chamber (FIG. 8), were tested to evaluate the effectiveness of the IDAM for more realistic 3D printing applications. As before, the transition from uniform (image d) to poor (image f) mixing occurred at the boundary (image e) also spanned by $\tilde{\Omega}_c=3$ Pe(lnPe$-$ln($\alpha^l/d$))/$\alpha$. The value of Bi for the lubricant gel ranged between 0.03≤Bi≤1 and for pluronic 0.19≤Bi≤1, hence at the highest rotation rates the inks were thoroughly fluidized. The similarity in the location of the boundary between mixing regimes for both the Newtonian (FIG. 5A) and non-Newtonian (FIG. 5B) liquids also suggested that the inks were sufficiently fluidized so that the precise value of Bi did not strongly affect the mixing efficiency of the IDAM.

Two streams of SE 1700, laden and unladen with 6-μm non-Brownian particles, were injected into the IDAM. The Shannon entropy index of the particle distributions across the filament width $s_f$ was measured under fluorescence microscopy to calculate the normalized mixing efficiency defined $$\varepsilon \equiv \frac{s_f - s_u}{s_m - s_u}. \tag{14}$$

The entropy of a hypothetically perfectly mixed filament is $s_m$, and the entropy of a completely unmixed filament is $s_u$, for which particles are uniformly present in only half the filament width. Example optical images of the particles in poorly (image a), moderately (image b) and well (image c) mixed filaments and the plot of E are shown in FIG. 6.

Figure 6:
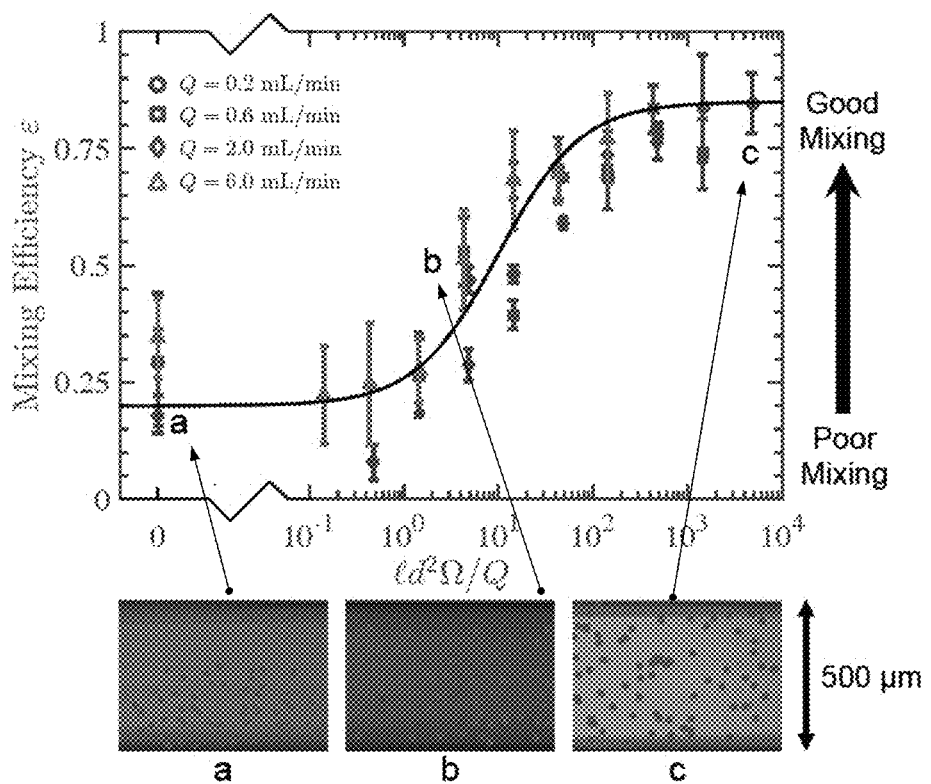
FIG. 6 illustrates a mixing efficiency against mixing ratio for four different flow rates.

FIG. 6 illustrates a mixing efficiency ε against mixing ratio ld$^2$ Ω/Q for four different flow rates. The solid line curve has been added to guide the eye. Three example particle distributions in the printed filament corresponding to different mixing ratios are shown below the plot. In the images a, b, and c below the chart, the dark dots have been added to indicate the position of each tracer particle in the filament.

The entropy index followed an approximately sigmoidal profile with mixing ratio between the limits of poor and good mixing as illustrated by the solid line curve in FIG. 6, which has been added to guide the eye. The failure of ε to attain precisely its expected asymptotic values of zero (perfectly unmixed) and one (perfectly mixed) at respectively low and high dimensionless rotation speeds, may have been due to the low particle seeding density in the filament, which could have prevented statistical convergence. The seeding density was selected to ensure nearly all particles in the filament were clearly visible without being optically obstructed by other particles lying below it. Above a critical value of the mixing ratio ld$^2$ Ω/Q≳100, ε reached a plateau indicating uniform particles dispersion in the filament. This result was in agreement with the proposed scaling relationship in Eq. (5) and indicated that the threshold for thorough mixing is given by $$\frac{ld^2\Omega}{Q} \sim 9\ln(d/d_p)/\alpha.$$

The IDAM was clearly capable of mixing a broad palette of materials. Therefore it was utilized for two different example applications to further evaluate its suitability for common types of 3D printing motifs. In the first application, the ratio of clear and pigmented material was controlled to vary the color of the printed structure. In the second, a polymer and cross-linking agent were mixed to create printed epoxy structures.

In the calibration measurements, the two streams were mixed in equal portion, but for the applications below, homogenization was required at ratios as large as 9:1, whose effect on mixing quality was not thoroughly characterized. Hence, to ensure full mixing according to Eq. (5), low flow rates (Q≤0.3 mL/min) and nearly the maximum achievable impeller speed (Ω=25 rad/s) were selected to ensure a large mixing ratio ld$^2$ Ω/Q≳2400. Furthermore, multiple notches were added along the length of the impeller (FIG. 9) to introduce rotational asymmetry in each revolution of the impeller and thereby enhance mixing.

Figures 7A, 7B, 7C:
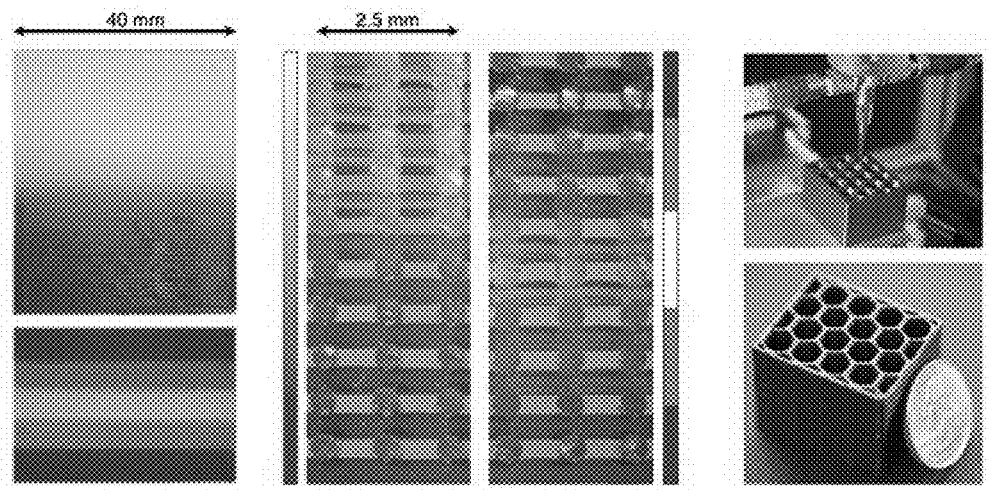
FIG. 7A shows optical images of a printed 2D carpet structures showing a continuously varying color gradient and a discrete change in color due to different amounts of pigment.
FIG. 7B shows images of a cross-section of 3D rectangular lattice structures showing continuous and discrete changes in color.
FIG. 7C illustrates 3D printing of a two-part epoxy honeycomb structure.

FIG. 7A is grey-scale optical images of a printed 2D carpet structures showing a continuously varying color gradient (top) and a discrete change in color due to different amounts of red pigment in SE 1700. FIG. 7B is grey-scale Images of the cross-section of 3D rectangular lattice structures showing continuous (left) and discrete (right) changes in color. FIG. 7C illustrates a 3D printing of a two-part epoxy honeycomb structure.

The color of an elastomeric ink (SE 1700) was continuously and discretely varied while printing 2D carpet and 3D rectangular lattice structures (FIG. 7A and FIG. 7B). A continuously varying color gradient was created by printing a fixed amount of material at five different monotonically varying flow rate ratios of clear and pigmented ink. This printing method was used to create the structures in FIG. 7A (top) and FIG. 7B (left) with a gradient from the purely clear to the fully red (in FIG. 7 fully dark) material. Discrete changes in color were achieved by purging the nozzle after changing to a new flow rate ratio. This latter printing method was used to create the structures in FIG. 7A (bottom) and FIG. 7B (right), for which the printing transitioned sequentially from fully red to pink (in FIG. 7, from dark to grey), to purely clear, again to pink and finally to fully red material (in FIG. 7, from grey to dark). The color uniformity in all five layers clearly demonstrates the ability of the IDAM to homogenize the color pigment.

The printed honeycomb structure made from a two-part epoxy is shown in FIG. 7C. A ratio of 20:80 vol % curing agent:resin was continuously mixed during the printing. The pot-life of the epoxy at room temperature was 45 minutes (taken here as the time after mixing at which the loss modulus of the material doubled). Although the time required printing the 72-layered honeycomb was approximately only 35 minutes, without using the mixing nozzle the extra time necessary for material preparation would have exceeded 10 minutes, potentially jeopardizing the print. Hence use of the IDAM overcame this time constraint and could have facilitated 3D printing over far longer periods or in continuous operation if necessary. Furthermore, the mixing chamber reduced the amount of wasted material, by requiring only the volume of material necessary for the structure to be mixed, and thereby leaving the unprinted resin and curing agent separate and available for future printing.

The above experimental results are based on the following methods:

Fluid Preparation:

The water:glycerol [20:80 wt %] mixture was prepared from deionized water and glycerol (Macron). The aqueous polymer lubricant (Klein Tools) was obtained commercially, and the pluronic aqueous solution was prepared by adding 30 wt % pluronic F-127 (Sigma Aldrich) to deionized water and dissolved at 4° C. for 48 hours before use. A red molecular tracer dye (IFWB-C7, Risk Reactor) was added to 40 mL batches of each fluid at approximately 1 µL/gram, corresponding to 0.025 wt % dye. To measure the mixing of non-Brownian particles 6-µm tracer particles (Fluoro-Max Thermo Scientific) at 0.04 wt % were added to polydimethylsiloxane (SE 1700, Dow Corning).

To demonstrate 3D printing with variable color, a stream of clear and pigmented (1 wt % red silicone pigment, SmoothOn) 10:1 resin:curing agent SE 1700 were mixed. The resin of the two-part epoxy used to print honeycomb structures was composed of 87 wt % EPON 828 (Momentive), 9 wt % TS-720 fumed silica (Cabot), 4 wt % blue epoxy pigment (System 3). The curing agent was composed of 90 wt % Epikure 3234 (Momentive) 10 wt % TS-720 fumed silica (Cabot).

Fluid Rheology:

The viscosity of each test fluid was measured with a stress-controlled rotational rheometer (AR2000ex, TA Instruments). At shear rates above $\dot{\gamma} \gtrsim 1$ s$^{-1}$, material was ejected from the gap due to edge fracture preventing reliable measurements at higher shear rates. Alternatively, a custom capillary rheometer was used to measure the viscosity at shear rates $1 \lesssim \dot{\gamma} \lesssim 1000$ s$^{-1}$. This system consisted of a syringe pump (PHD Ultra, Harvard Apparatus), 1.0 mL glass Luer lock syringe (Hamilton Gastight), a diaphragm pressure transducer (PX44E0-1KGI, Omega Engineering) and disposable Luer lock needle tips (Norsdon EFD). The pressure drop across the capillary tips was measured over a range of flow rates. The Bagely correction and the Weissenberg-Rabinowitsch correction were applied to determine the resultant flow curves shown in FIG. 10.

Figure 10:
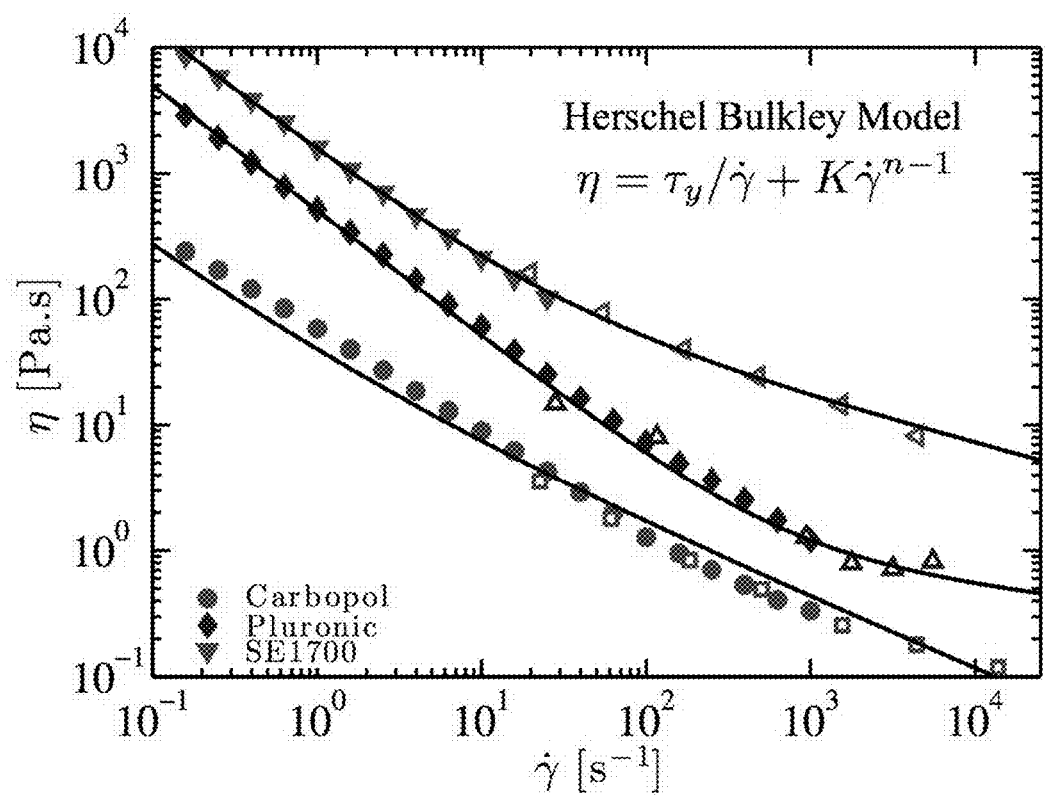
FIG. 10 illustrates rheological flow curves of three ink formulations used in calibration tests in example embodiments.

FIG. 10 illustrates rheological flow curves of the three ink formulations used in calibration tests in this work. Data taken with the rotational rheometer (filled symbols) and the capillary rheometer (hollow symbols) are shown. The black solid lines are the respective fits of the Herschel-Bulkley model given by the fitting parameters listed in Table 1.

Measurement of Diffusion Coefficients:

The molecular diffusion coefficient of the IFWB-C7 dye (rhodamine-WT, absorption/emission: 550/588 nm, Risk Reactor) was measured in the aqueous solutions using a custom Y-type rectilinear capillary channel with inner dimensions h×w=900×900 µm (Vitrocom). The channel was submerged in immersion oil (n=1.48, Type FF, Cargille) to minimize refraction, illuminated with a mercury lamp (local emission peak at 546 nm) and visualized through a TRITC filter cube (peak transmittance 580-630 nm) using a QColor 5 camera (Olympus) and a 10× objective on an inverted epifluorescence microscope (Olympus IX71). Calibration measurements were taken to relate the intensity of the emitted light to the dye concentration and at each pixel to account for spatial variations in the illumination intensity. During each measurement, a stream of dyed fluid and a second stream of undyed fluid were pumped at equal flow rates into the channel. Once a sharp interface between the two streams had stabilized at the channel midplane, the pumping was stopped and the subsequent evolution of the concentration profile across the width of the channel was recorded at 1 cm downstream from the Y-junction.

The evolution equation for the concentration C(x, t) across the channel is $$\frac{\partial C}{\partial t} = D \frac{\partial^2 C}{\partial x^2}$$

where x is the spatial coordinate, t is time and $\mathcal{D}$ is the molecular diffusion coefficient. The initial condition for the experiments in the capillary channel is C(x, 0)=C$_0$H(x), where C$_0$ is the initial concentration in the first stream and H(x) is the Heaviside function. There are no flux boundary conditions at both walls, $\partial C/\partial x=0$ at x=±w/2. The concentration profile is given by $$\frac{C(x,t)}{C_0} = \frac{1}{2}\left\{1 + 4\sum_{n\,odd}^{\infty} \frac{1}{n\pi}\sin\left(n\pi\frac{x}{w}\right)\exp\left((n\pi)^2\frac{Dt}{w^2}\right)\right\} \quad (15)$$

The value of $\mathcal{D}$ was determined from the average of multiple fits of Eq. (15) to the measured concentration profiles at multiple positions along the channel width (x=±⅓, ¼, ⅕x/w). An example concentration profile is shown in FIG. 11.

Figure 11A:
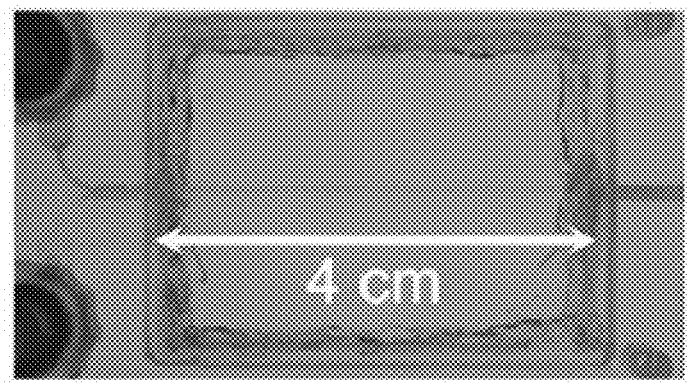
FIGS. 11A-11C show measurements of a diffusion coefficient of a IFWB-C7 dye.
Figure 11B:
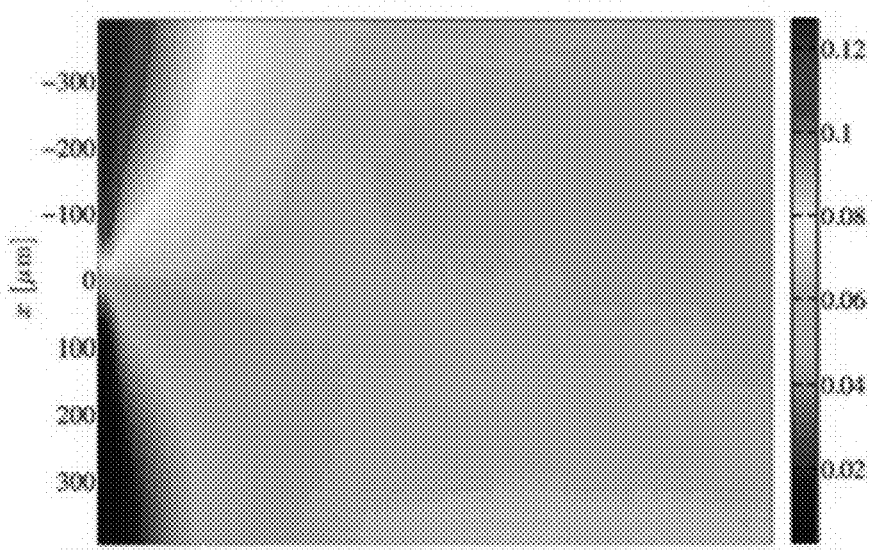
Figure 11C:
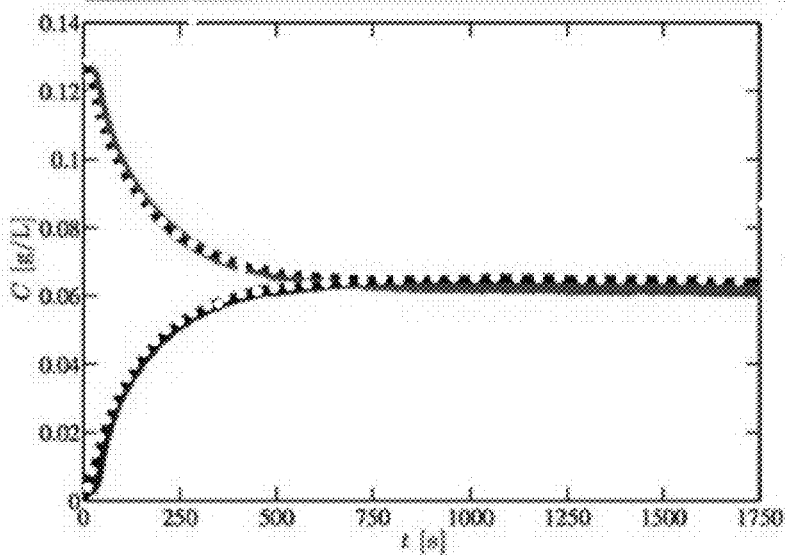

FIG. 11 shows measurements of the diffusion coefficient of the IFWB-C7 dye (rhodamine-WT, Risk Reactor) at 23° C. FIG. 11A is a top view of the capillary with the injected dyed and undyed streams. FIG. 11B is a spatiotemporal plot of experimentally measured dye concentration [g/L] in water (viscosity µ=0.001 Pa·s). FIG. 11C shows evolution of the concentration at x=−180 µm (top solid curve) and x=180 µm (bottom solid curve). The white-dot curves are the fit of C(x,t) from Eq. (15) with x=±180 µm, w=900 µm, C$_0$=0.13 g/L and $\mathcal{D}$=500 µm$^2$/s. The Stokes-Einstein equation was used to estimate the molecular diameter of the tracer dye $d_p=k_BT/3\pi\mu\mathcal{D}$ =0.87 nm.

For this study, a particle was considered Brownian if the ratio of thermal stresses acting on a particle to viscous stresses in the Newtonian fluids or the yield stress of the viscoelastic ink ($\wedge_1 \equiv k_BT d/\mu U d_p^3$, and $\wedge_2 \equiv k_BT/d_p^3 \tau_y$, respectively) far exceeded unity, where $k_B$ is the Boltzman constant, T is the absolute temperature, µ is the fluid viscosity, $d_p$ is the particle diameter, and $\tau_y$ is the yield stress. Measurements of the diffusion coefficient $\mathcal{D}$ of the dye used in this study (FIG. 11) indicated that its molecular diameter was approximately $d_p$=0.87 nm. For T=295 K, µ=1.2 Pa·s (glycerol), U~1 m/s (maximum print speed), and $\tau_y$=500 Pa (pluronic), the ratios $\wedge_1 \sim O(10^3)$ and $\wedge_2 \sim O(10^4)$, which confirmed the dominance of thermal forces on the dye molecules. Conversely, for the $d_p$=6 µm fluorescent particles, $\wedge_2 \sim O(10^8) \ll 1$ and hence the particles were non-Brownian.

Nozzle Manufacture:

Passive mixing chambers were machined from two poly (methyl methacrylate) (PMMA) polymer blocks using a CNC-mill (8540, Sherline Products Inc.). The grooves were milled with a 200-µm end mill (Ultra-Tool International), while all larger features were milled with a 3-mm end mill. Luer lock connectors were added to each block. A 480-µm thick plastic (PETG) shim stock (Artus Corp.) was machined and used as a spacer between the two PMMA blocks, which were bolted together to ensure a tight seal. An optical image of one of the passive mixing chambers used in this study is shown in FIG. 9 along with expanded views of the walls of the passive mixing chamber. For both designs, the channel dimensions were l=15 mm and d=500 µm. In the grooved wall mixing chamber, the spacing between 120 µm wide grooves positioned 45° relative to the primary direction of flow was λ=200 µm. The net volume of the mixing chamber was 3.6 µL, and thus the mixing chamber could be purged (to change extrudate composition) in approximately 15 mm of printed material.

Figures 12A, 12B:
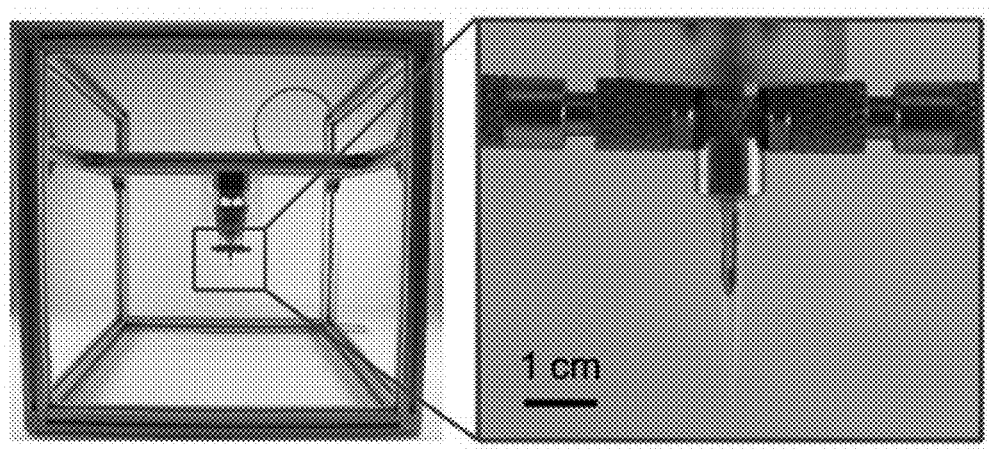
FIG. 12A is a picture of a superstructure used to hold the nozzle during printing.
FIG. 12B is a magnified image of the metal nozzle used for printing a viscous two-part epoxy.

The active mixing chamber was fabricated by attaching two 1.54-mm diameter (gauge 14, Nordsen EFD) needle tips into a threaded plastic male Luer lock connector. The tips were then glued in place to prevent leakage. The connector was attached to a PMMA block that was mounted to the nozzle superstructure. The impeller was made from a 0.109-inch diameter reamer (Alvord-Polk Tools) that was ground down to fit within the plastic tip of the nozzle. Notches were added to one of the impellers to enhance mixing. A stepper motor drove the impeller shaft, which was sealed using an O-ring. A second active mixing chamber using metal Luer lock components (FIG. 12A is a picture of the superstructure used to hold the nozzle during printing, and FIG. 12B is a magnified image of the metal nozzle used for printing the viscous two-part epoxy.) was fabricated to tolerate the higher pressures necessary for the two-part epoxy. The overall dimensions of this mixing nozzle were l=30 mm and d=4 mm, and the impeller diameter was δ=2.7 mm. The volume of the active mixing chamber was approximately 150 μL. Hence for a nozzle with tip diameter α=500 μm, at least 760 mm of printed material are required to purge the mixing chamber.

Flow Visualization, Imaging and Mixing Quantification:

In order to image the concentration distribution of the fluorescent tracer dye in the nozzle cross-section, the test fluids were extruded onto a transparent petri dish under which a uEye camera (Imaging Development Systems) was positioned and recording. Flow rates were in the range $0.006 \leq Q \leq 20$ mL/min. The rotational speeds of the impeller were in the range $\Omega=0$, $0.01 \leq \Omega \leq 30$ rad/s ($\Omega=0.0.095 \leq \Omega \leq 286$ rpm). The images were subsequently analyzed in Matlab to determine the uniformity of the concentration profile. The mean $I_{mean}$ and standard deviation $I_{std}$ of the color saturation level (passive mixing chamber) or the intensity of the red channel (active mixing chamber) in the image was calculated to determine the coefficient of variation $c_v \equiv I_{std}/I_{mean}$, and thereby the uniformity of mixing.

The distributions of non-Brownian fluorescent particles in the printed SE 1700 filaments were measured with a 10× objective on an inverted epifluorescence microscope(Olympus IX71) using a QColor 5 camera (Olympus). A Matlab script written by the authors was used to determine the Shannon entropy index of the particles $s_i = \Sigma_{j=1}^{k} P(x_j) \ln P(x_j)$ where $P(x_j)$ is the probability of finding a particle in the $j^{th}$-bin for the probability density function with k bins. Each bin corresponded to 20-μm sections of the printed filament. Referring to Eq. (14) the measured entropy of the printed filament is $s_f$. The entropy of a hypothetically perfectly mixed filament is $s_m$, for which particles are uniformly distributed, hence $P(x_j)=k^{-1}$. The entropy of a completely unmixed filament is $s_u$, for which particles are uniformly present in only half the filament width, so $P(x_j)=0$ for $j \leq \frac{1}{2}k$ and $P(x_j)=2 k^{-1}$ for $j > \frac{1}{2}k$.

Printing Control:

For all tests and prints the nozzle was fixed in the lab frame and held by a superstructure. Movement of the substrate was controlled by a high-precision XYZ air bearing gantry (Aerotech, Inc.). The inks were contained in 3, 5 or 10 mL plastic syringes (Becton Dickinson) and driven by two opposed syringe pumps (PHD Ultra, Harvard Apparatus) that were controlled directly by the NView HMI software (Aerotech, Inc.).

Accordingly, the present disclosure provides 3D printers with microfluidic active mixing nozzles for three-dimensional printing of viscoelastic inks. The disclosures also provide methods of operating the 3D printers. The disclosure provides tested simple scaling relationships governing the performance of an active mixing system utilizing a rotational impeller. The present disclosure provides an improved technology to control the mixing intensity independently from the flow rate.

While exemplary embodiments of the present disclosure relate to 3D printers with microfluidic active mixing nozzles for three-dimensional printing of viscoelastic inks, the devices and methods may also be applied to other applications. For example, in addition to a 3D printer, the devices and methods may also be applied to other equipment that mixes two or more fluids, such as cements in the construction industry or ice creams, coffee, or liquid chocolate in the food industry. The present disclosure intends to cover the broadest scope of systems and methods for mixing multiple fluids together.

Further, in the present disclosure, subject matter described therein is with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. The above detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of exemplary embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Thus, exemplary embodiments illustrated in the figures serve only as examples to illustrate several ways of implementation of the present disclosure. They should not be construed as to limit the spirit and scope of the exemplary embodiments of the present disclosure. It should be noted that those skilled in the art may still make various modifications or variations without departing from the spirit and scope of the exemplary embodiments. Such modifications and variations shall fall within the protection scope of the exemplary embodiments, as defined in attached claims.

We claim:

1. A microfluidic printing nozzle for 3D printing, comprising:
a mixing chamber;
a first inlet for connecting with a first ink source, the first inlet located at a first end of the mixing chamber;
a second inlet for connecting with a second ink source, the second inlet located at the first end of the mixing chamber;
an outlet located at a second end of the mixing chamber; and
a generally cylindrical impeller rotatably disposed in the mixing chamber between the first end and the second end,
wherein the impeller includes an outer surface, and the outer surface of the impeller includes a groove, a protrusion, or both, to facilitate mixing of fluidic inks flowing from the first end to the second end of the mixing chamber.

2. The microfluidic printing nozzle of claim 1, further comprising an actuation device configured to move the mixing chamber and the impeller relative to a substrate during a 3D printing process, wherein the movement is along an X-axis and a Y-axis, and optionally a Z-axis.

3. The microfluidic printing nozzle of claim 1, wherein the outer surface of the impeller includes a spiral protrusion.

4. The microfluidic printing nozzle of claim 3, wherein the spiral protrusion extends from a first end of the impeller to a second end of the impeller.

5. The microfluidic printing nozzle of claim 1, wherein the mixing chamber is cylindrical and includes a first hydraulic diameter, wherein the impeller includes a second hydraulic diameter, and wherein the first hydraulic diameter is about 50% larger than the second hydraulic diameter, or less.

6. The microfluidic printing nozzle of claim 1, further comprising a controller in electrical communication with the first ink source, the second ink source, and a motor assembly configured to rotate the impeller.

7. The microfluidic printing nozzle of claim 6, wherein the controller is configured to determine a threshold rotational speed of the impeller based on a volumetric flow rate of at least a first fluidic ink provided by the first ink source and a second fluidic ink provided by the second ink source and the material properties of the ink.

8. The microfluidic printing nozzle of claim 1, wherein the impeller includes axial protrusions along its length, optionally having notches in the axial protrusions.

9. The microfluidic printing nozzle of claim 1, wherein the mixing chamber is generally cylindrical, and the impeller is axially aligned with the mixing chamber.

10. The microfluidic printing nozzle of claim 1, wherein the mixing chamber comprises an internal wall surface having grooves defined therein.

11. A microfluidic printing nozzle for 3D printing, comprising:
a mixing chamber;
a first inlet connected to a first ink source, the first inlet located at a first end of the mixing chamber;
a second inlet connected to a second ink source, the second inlet located at the first end of the mixing chamber;
an outlet located at a second end of the mixing chamber;
an impeller rotatably disposed in the mixing chamber between the first end and the second end; and
a controller in electrical communication with the first ink source, the second ink source, and the impeller,
wherein the controller is configured to determine a threshold speed of the impeller based on a volumetric flow rate of at least a first fluidic ink provided by the first ink source and a second fluidic ink provided by the second ink source.

12. The microfluidic printing nozzle of claim 11, wherein the impeller is generally cylindrical with a radial outer surface that includes grooves, protrusions, or both.

13. The microfluidic printing nozzle of claim 11, further comprising an actuation device configured to move the mixing chamber and the impeller relative to a substrate during a 3D printing process, wherein the movement is along an X-axis and a Y-axis, and optionally a Z-axis.

14. The microfluidic printing nozzle of claim 11, wherein a radial outer surface of the impeller includes a spiral protrusion.

15. The microfluidic printing nozzle of claim 14, wherein the spiral protrusion extends from a first end of the impeller to a second end of the impeller.

16. The microfluidic printing nozzle of claim 15, wherein the mixing chamber is cylindrical and includes a first hydraulic diameter, wherein the impeller includes a second hydraulic diameter, and wherein the first hydraulic diameter is about 50% larger than the second hydraulic diameter, or less.

17. The microfluidic printing nozzle of claim 11, wherein the mixing chamber comprises an internal wall surface having grooves defined therein.

18. A method of 3D printing, comprising:
extruding a mixed ink filament from a nozzle, the nozzle comprising:
a mixing chamber;
a first inlet for connecting with a first ink source, the first inlet located at a first end of the mixing chamber;
a second inlet for connecting with a second ink source, the second inlet located at the first end of the mixing chamber;
an outlet located at a second end of the mixing chamber; and
a generally cylindrical impeller rotatably disposed in the mixing chamber between the first end and the second end,
wherein the impeller includes an outer surface, and the outer surface of the impeller includes a groove, a protrusion, or both, to facilitate mixing of fluidic inks flowing from the first end to the second end of the mixing chamber.

19. The method of claim 18, wherein the nozzle further comprises an actuation device configured to move the mixing chamber and the impeller relative to a substrate during a 3D printing process, wherein the movement is along an X-axis and a Y-axis, and optionally a Z-axis.

20. The method of claim 18, wherein the outer surface of the impeller includes a spiral protrusion.

* * * * *